US012753056B2

(12) United States Patent
Contessini

(10) Patent No.: US 12,753,056 B2
(45) Date of Patent: Oct. 6, 2026

(54) LIFTING VEHICLE WITH TILTING CAB

(71) Applicant: Merlo Project S.r.l., Cervasca Cuneo (IT)

(72) Inventor: Felice Contessini, Cervasca Cuneo (IT)

(73) Assignee: Merlo Project S.r.l., Cervasca Cuneo (IT)

(*) Notice: Subject to any disclaimer, the term of this patent is extended or adjusted under 35 U.S.C. 154(b) by 212 days.

(21) Appl. No.: 18/653,144

(22) Filed: May 2, 2024

(65) Prior Publication Data

US 2025/0002312 A1 Jan. 2, 2025

(30) Foreign Application Priority Data

May 3, 2023 (IT) ........................ 102023000008667

(51) Int. Cl.
*B66F 9/24* (2006.01)
*B66F 9/065* (2006.01)
*B66F 9/075* (2006.01)

(52) U.S. Cl.
CPC .......... *B66F 9/0655* (2013.01); *B66F 9/0755* (2013.01)

(58) Field of Classification Search
USPC ............................................ 414/718; 701/50
See application file for complete search history.

(56) References Cited

U.S. PATENT DOCUMENTS

| | | | | |
|---|---|---|---|---|
| 6,308,441 B1 * | 10/2001 | Bolitho | ................ | B60K 17/356 37/411 |
| 9,200,429 B2 * | 12/2015 | Thompson | .............. | E02F 9/024 |
| 12,202,715 B2 * | 1/2025 | Masters | .............. | B66F 9/07559 |
| 2011/0017537 A1 * | 1/2011 | Andou | ................... | B62D 25/08 296/190.01 |
| 2015/0117998 A1 * | 4/2015 | Thompson | ........... | B60G 17/005 701/50 |
| 2019/0322506 A1 * | 10/2019 | Ourada | ................ | B62D 55/116 |
| 2020/0331541 A1 * | 10/2020 | Hukkanen | ............ | B62D 33/063 |
| 2023/0078475 A1 * | 3/2023 | Selvam | .................. | E02F 9/166 180/89.13 |

FOREIGN PATENT DOCUMENTS

| | | | | |
|---|---|---|---|---|
| JP | S6141186 U | 3/1986 | | |
| JP | 2009190825 A | 8/2009 | | |
| KR | 200303037 Y1 | 4/2003 | | |
| WO | WO-2008016310 A1 * | 2/2008 | ............. | E02F 9/028 |

OTHER PUBLICATIONS

Search Report dated Nov. 3, 2023. 13 pages.

* cited by examiner

*Primary Examiner* — Jonathan L Sample
(74) *Attorney, Agent, or Firm* — RMCK Law Group PLC

(57) ABSTRACT

A lifting vehicle includes: a chassis, a telescopic boom articulated to the chassis and provided at a distal end with a mounting for attaching implements for handling a load, a control cab, at least one cab tilt actuator configured to vary a tilt angle of the cab with respect to the chassis, and an automatic tilt adjustment system configured to control said cab tilt actuator to automatically vary a tilt angle of the control cab with respect to the chassis as a function of the position of the load.

7 Claims, 5 Drawing Sheets

LIFTING VEHICLE WITH TILTING CAB

CROSS-REFERENCE TO RELATED APPLICATION

This application claims priority to Italian Patent Application No. 102023000008667 filed May 3, 2023. The disclosure of the above application is incorporated herein by reference in its entirety.

FIELD OF THE INVENTION

The present invention relates to a lifting vehicle comprising a chassis (fixed, with tilt and/or translation system, or rotating), a telescopic boom articulated to the chassis and equipped at one of its distal ends with a mounting for attaching implements, and a control cab in which the driving and control devices of the vehicle are arranged.

DESCRIPTION OF THE PRIOR ART

Lifting vehicles of this type, also known as telehandlers, are machines used mainly in construction and agriculture to lift and transport heavy materials.

These vehicles may be equipped with different types of implements such as forks, shovels, aerial platforms, winches for suspended loads, etc. mounted at the distal end of the telescopic boom.

During operation, the position of the load carried by the implement located at the end of the telescopic boom may vary within very wide ranges. In the case of vehicles with very high lifting capacity, in certain working conditions the load carried by the implement may be outside the field of vision of the operator sitting in the control cab and may force the operator to lean over or assume awkward positions to keep the load in his field of vision. The situation is made more complex in that the viewing conditions of the load vary considerably depending on the type of implement that the vehicle is using.

In the state of the art, lifting vehicles have already been proposed in which the cab can be tilted during the work to improve the load viewing conditions for the operator.

The tilt of the cab allows the operator to have a better and clearer view of the load and the working area and prevents the operator from having to lean over or assume uncomfortable positions. This is particularly useful when the vehicle works in conditions wherein the tilt angle and boom extension are very high.

In known solutions, the tilt of the cab is controlled by a hydraulic actuator activated by a control device located in the cab and operated manually by the operator.

One problem with known solutions is that once a certain position has been set, the cab remains in the selected position. The operator is therefore forced to continuously correct the cab tilt angle when the position of the load changes during the work.

OBJECT AND SUMMARY OF THE INVENTION

The object of the present invention is to provide a lifting vehicle that overcomes the problems of the prior art.

According to the present invention, this object is achieved by a vehicle having the characteristics forming the subject of claim 1.

Preferred embodiments of the invention form the subject of the dependent claims.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

DETAILED DESCRIPTION

Figure 1:
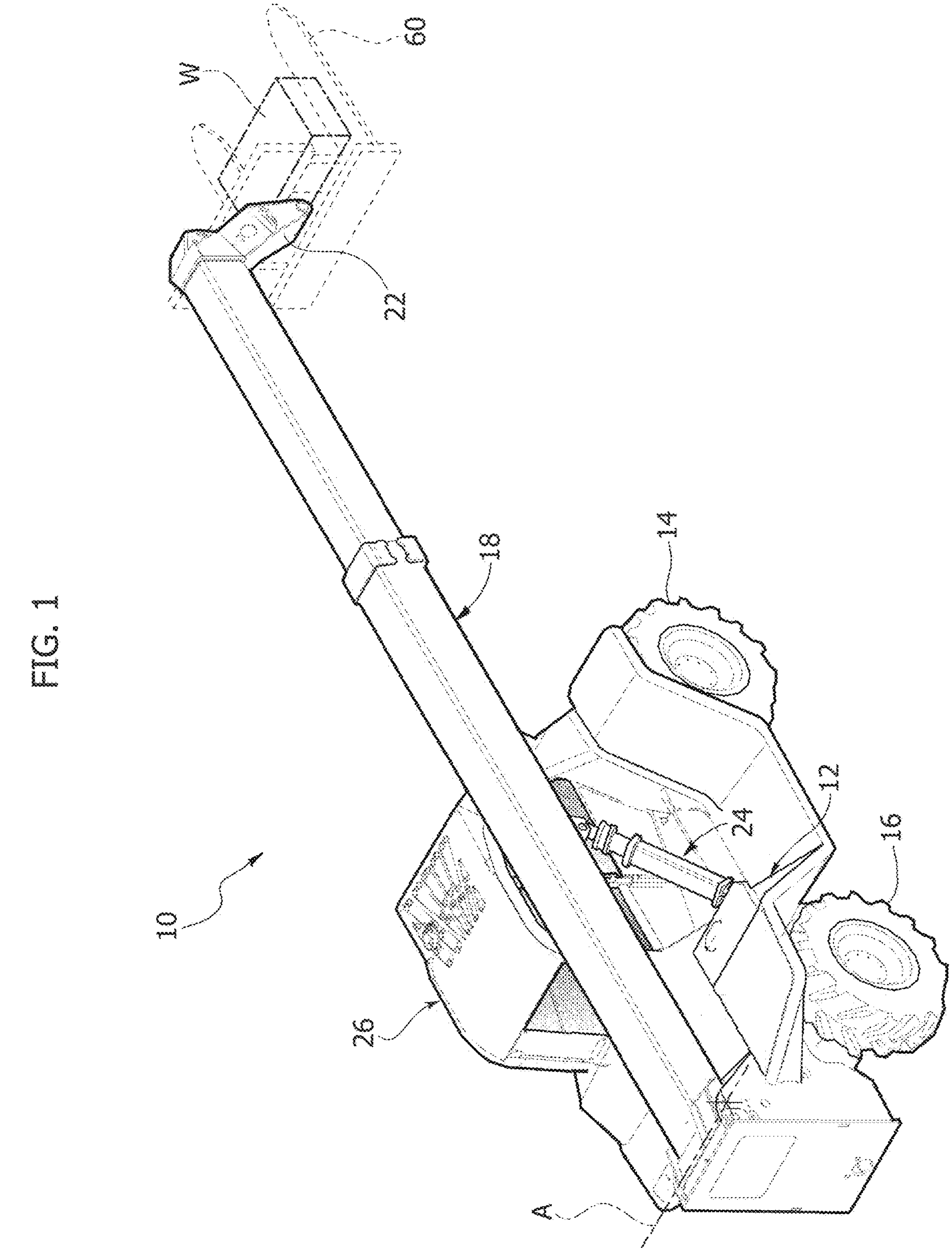
FIG. 1 is a perspective view of a lifting vehicle with a telescopic boom.

With reference to the figures, numeral 10 indicates a lifting vehicle according to the present invention.

The lifting vehicle 10 comprises, by way of example only, a chassis 12 carrying a pair of front wheels 14 and a pair of rear wheels 16. The vehicle 10 comprises a telescopic boom 18 articulated to a rear section of the chassis 12 around a transverse axis A. The telescopic boom 18 is equipped at its distal end with a mounting 22 for attaching implements 60 of different types, such as, for example, forks, shovels, aerial platforms, winches for suspended loads, etc. The implement 60 is suitable for handling a load generally indicated by W.

The lifting vehicle 10 comprises at least one lifting cylinder 24 arranged between the telescopic boom 18 and the chassis 12 and configured to vary the tilt angle $\alpha$ of the telescopic boom 18 with respect to the chassis 12. The telescopic boom is also equipped with at least one extension cylinder (not shown), which controls the telescopic extension and retraction movement of the telescopic boom 18.

The lifting vehicle 10 comprises a control cab 26 carried by the chassis 12 and located laterally with respect to the telescopic boom 18. The control cab 26 houses a seat for an operator and all the driving and control devices of the lifting vehicle 10.

In a possible embodiment, the chassis 12 may comprise a lower section carrying the wheels 14, 16 and an upper section, rotatable with respect to the lower section around a vertical axis and carrying the telescopic boom 18 and the control cab 26.

The control cab 26 can be tilted with respect to the chassis 12 so as to allow the operator seated in the control cab 26 to have a better and clearer view of the load W and the surrounding working area. The tilt of the cab allows the operator to remain in an optimal working position, preventing him from having to lean over or assume uncomfortable positions to view the load and the surrounding areas. This is particularly useful when the vehicle works in conditions that would take the load W out of the operator's field of vision, particularly when the tilt angle and boom extension are very high.

Figure 2:
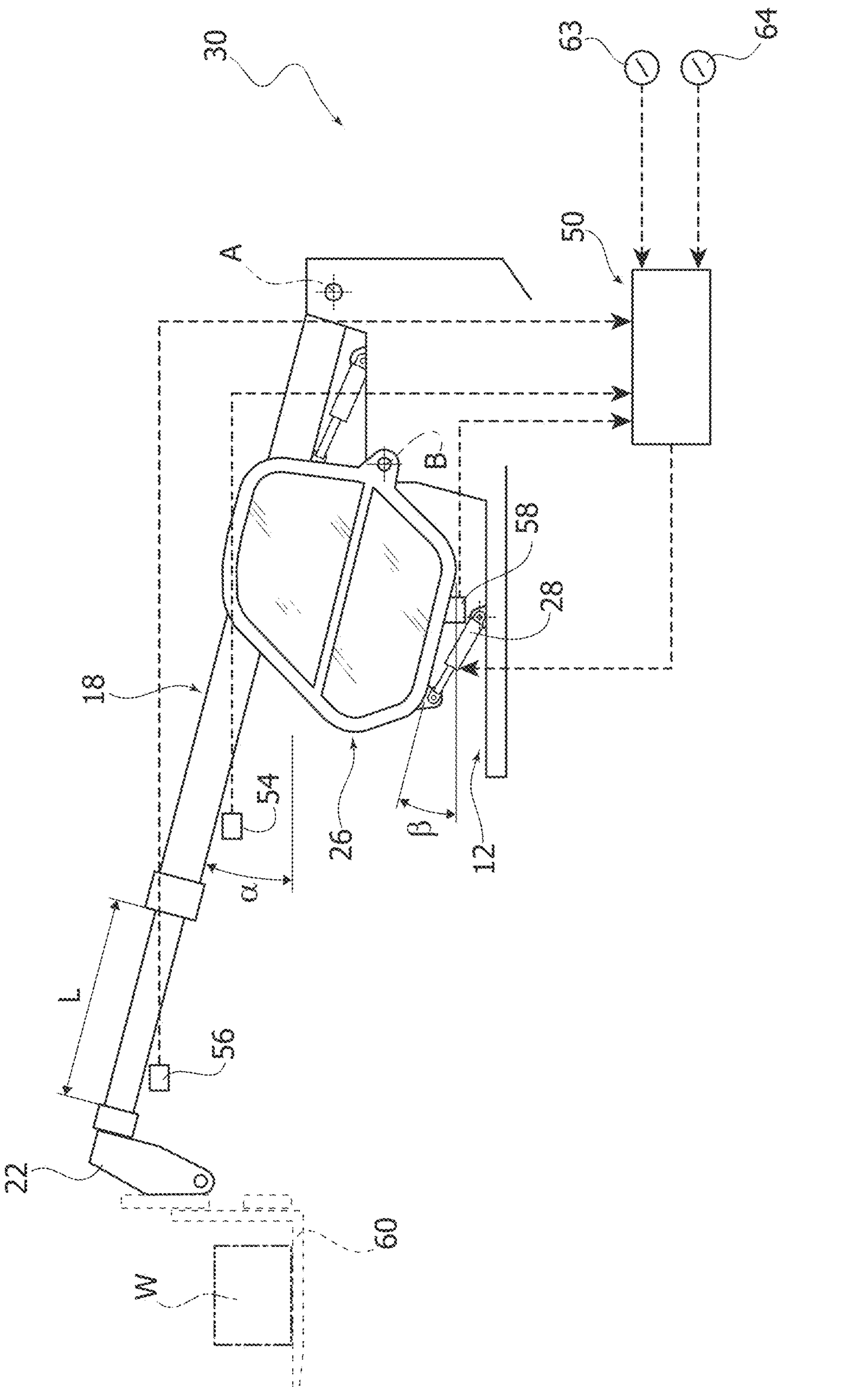
FIG. 2 is a simplified diagram of the cab tilt system.

With reference to FIG. 2, the lifting vehicle 10 comprises at least one cab tilt actuator 28 configured to vary the tilt angle $\beta$ of the control cab 26 with respect to the chassis 12.

With reference to FIG. 2, in a possible embodiment, the control cab 26 may be articulated to the chassis 12 around an axis B parallel to the articulation axis A of the telescopic boom 18 and the tilt actuator of the cab 28 is controlled to make the control cab 26 oscillate around its articulation axis B and set a required tilt angle $\beta$ of the control cab 26.

Figure 3:
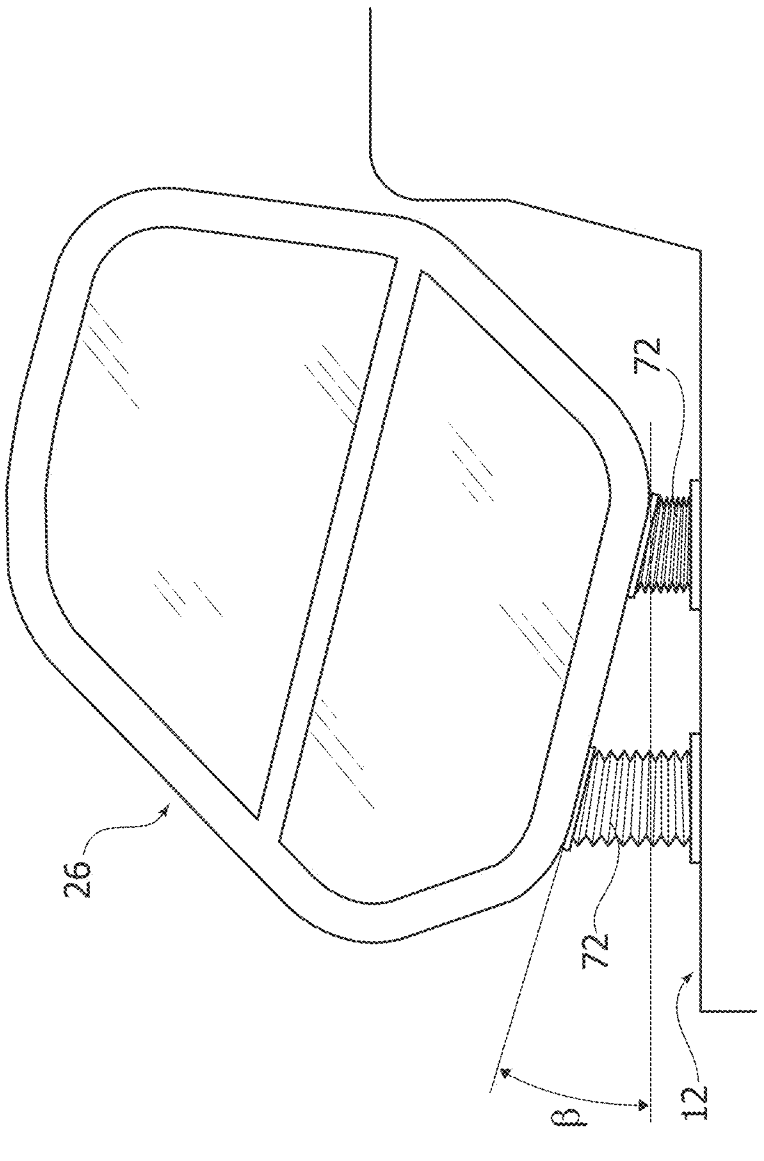
FIG. 3 is a diagram showing an alternative embodiment of the cab tilt system.

With reference to FIG. 3, in a possible embodiment the control cab 26 may be connected to the chassis 12 by a plurality of active suspension elements 72, controlled to set a required tilt angle β of the control cab 26.

With reference to FIG. 2, the lifting vehicle 10 comprises an automatic tilt adjustment system 30 configured to control at least one tilt actuator of the cab 28, 72 to automatically vary the tilt angle β of the control cab 26 with respect to the chassis 12 depending on the position of the load W.

The tilt angle β of the control cab 26 with respect to a horizontal direction may vary between a minimum value equal to, for example, 0° and a maximum value equal to, for example, 20°.

With reference to FIG. 2, the automatic tilt adjustment system 30 comprises a length sensor 56 configured for detecting the extension length L of the telescopic boom 18 and an angle sensor 54 configured for detecting the tilt angle α of the telescopic boom 18 with respect to chassis 12. The automatic tilt adjustment system 30 also comprises a cab tilt sensor 58 that measures the tilt angle β of the control cab 26. The cab tilt sensor 58 may be, for example, a linear or angle sensor.

The automatic tilt adjustment system 30 comprises an electronic control unit 50 configured to receive information provided by the length sensor 56, the angle sensor 54 and the cab tilt sensor 58 to control at least one cab tilt actuator 28, 72 depending on information provided by the length sensor 56, the angle sensor 54 and the cab tilt sensor 58.

Figure 6:
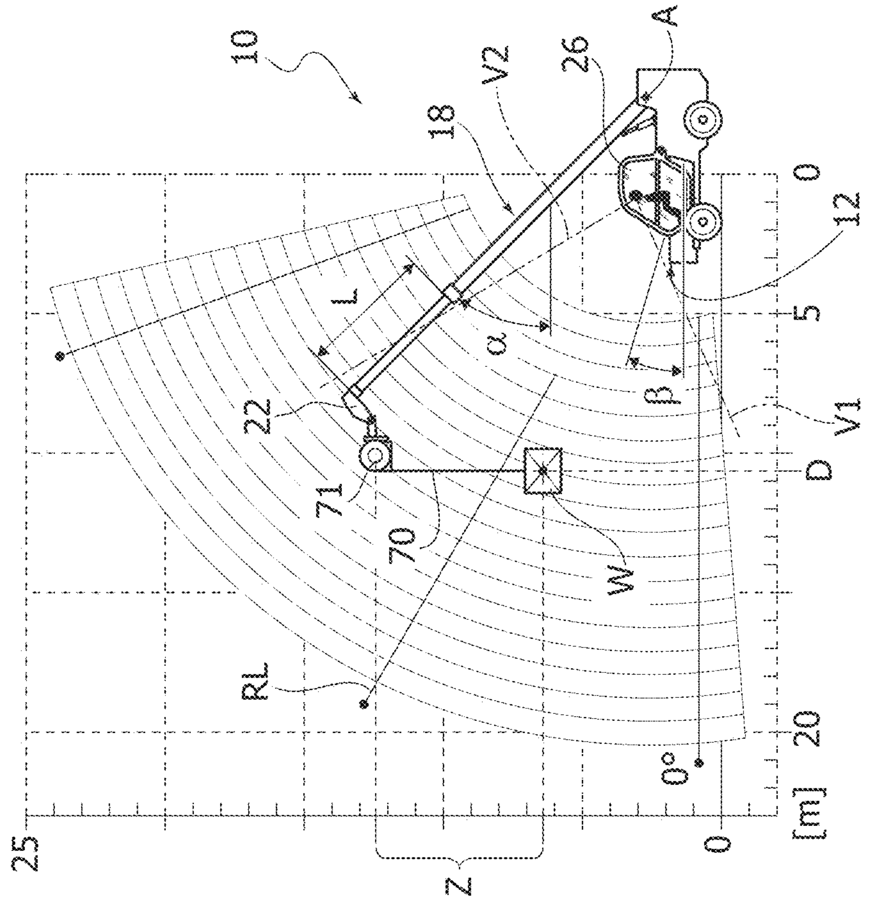

With reference to FIG. 6, when the implement 60 attached to the mounting 22 of the telescopic boom 18 is a cable lifting device 71, for example, a winch or a hoist wherein the load W is suspended at the end of a cable 70, the electronic control unit 50 is configured to control the cab tilt actuator 28, 72 also as a function of the vertical extension length Z of the cable 70. The vertical extension length Z of the cable 70 may be determined on the basis of information provided, for example, by an encoder located on the shaft of the cable lifting device 71.

An algorithm may be installed in the electronic control unit 50 which automatically determines the tilt angle β of the control cab 26 as a function of the position of the load W, calculated on the basis of the information provided by the length sensor 56, by the angle sensor 54, by the cab tilt sensor 58 and, in the case of a suspended load, as a function of the vertical extension length Z of the cable 70.

Figure 5:
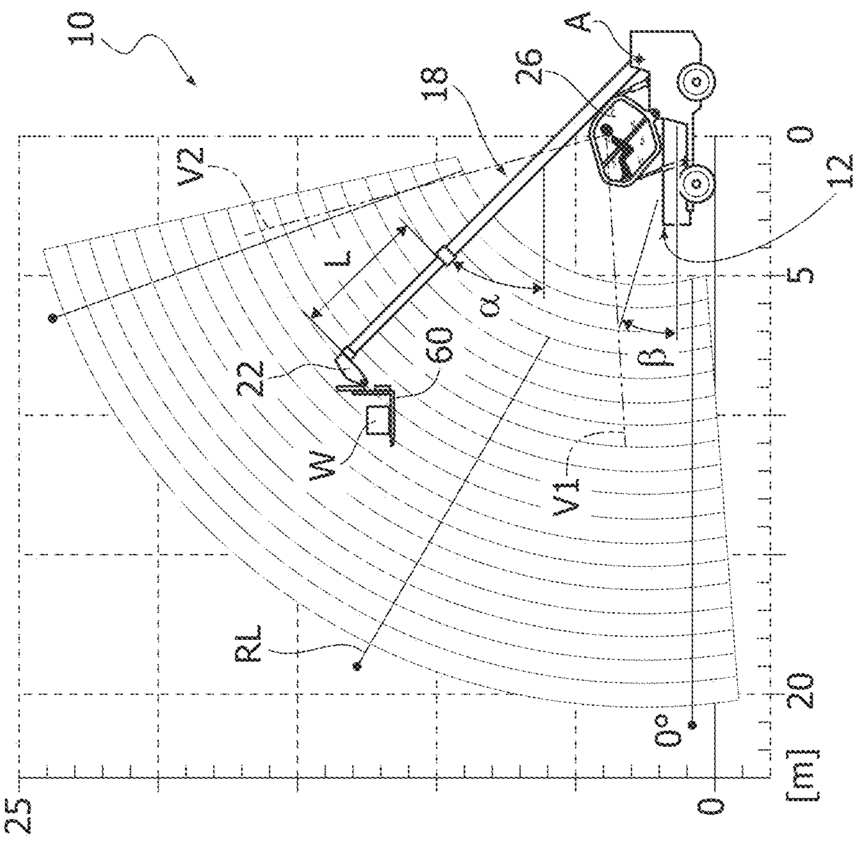
FIGS. 4, 5 and 6 are diagrams showing various working positions of a vehicle according to the invention.
Figure 4:
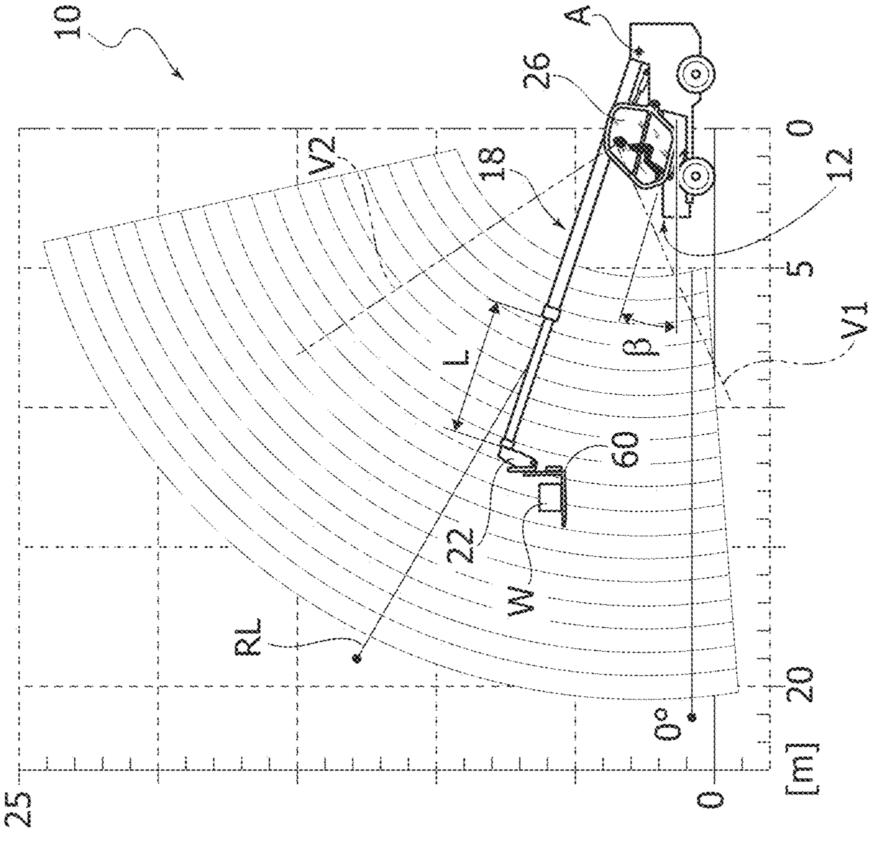

With reference to FIGS. 4, 5, and 6, the electronic control unit 50 may be programmed to set the tilt angle β of the control cab 26 to 0° when the load W is below a reference line RL that is tilted with respect to a horizontal direction by approximately 30°.

When the load W is above the reference line RL, the electronic control unit 50 automatically sets the tilt angle β of the control cab 26 so that the load W is between two lines V1, V2 that define the operator's field of vision.

In a possible embodiment, the electronic control unit 50 could be configured to allow the operator to manually set the control parameters of the tilt angle β of the control cab 26.

For example, the electronic control unit 50 may be connected to a first selector 63, which can be set manually by the operator to select a ratio between the tilt angle α of the telescopic boom 18 and the tilt angle β of the control cab 26.

The electronic control unit 50 may be connected to a second selector 64, which can be set manually by the operator to select a minimum tilt angle of the telescopic boom 18 below which the cab 26 is not tilted.

Both when the tilt angle β of the control cab 26 is automatically determined by an algorithm based on the position of the load W, and when the tilt angle β is set by the operator as a ratio to the tilt angle α of the telescopic boom 18, during operation the tilt angle β of the control cab 26 is automatically adjusted by the electronic control unit 50 so as to constantly keep the load W within the operator's field of vision without the need for any intervention by the operator.

The solution according to the invention therefore allows improvement of safety of the work as it constantly keeps the load in the operator's field of vision and prevents the operator from having to carry out manual operations of orientation of the cab, which would distract attention from the load handling operations.

Of course, without prejudice to the principle of the invention, the details of construction and the embodiments can be widely varied with respect to those described and illustrated, without thereby departing from the scope of the invention as defined by the claims that follow.

The invention claimed is:

1. A lifting vehicle, comprising:
- a chassis,
- a telescopic boom articulated to the chassis and provided at a distal end with a mounting for attaching implements for handling a load,
- at least one lifting cylinder arranged between the telescopic boom and the chassis and configured to control a tilt angle of the telescopic boom with respect to the chassis,
- a control cab carried by the chassis, wherein the control cab can be tilted with respect to the chassis,
- at least one cab tilt actuator configured to vary a tilt angle of the control cab with respect to the chassis, and
- an automatic tilt adjustment system configured to control said at least one cab tilt actuator to automatically vary the tilt angle of the control cab with respect to the chassis as a function of a position of said load,
- wherein said automatic tilt adjustment system comprises:
  - a length sensor configured to detect an extension length of said telescopic boom,
  - an angle sensor configured to detect the tilt angle of the telescopic boom with respect to the chassis,
  - a cab tilt sensor configured to detect the tilt angle of the control cab with respect to the chassis, and
  - an electronic control unit configured to receive information supplied by the length sensor and angle sensor and to control said at least one cab tilt actuator according to information supplied by said length sensor and angle sensor.

2. The lifting vehicle of claim 1, wherein the implement attached to said mounting is a lifting device including a cable for supporting a suspended load, wherein said electronic control unit is configured to control said at least one cab tilt actuator also according to a vertical extension length of said cable.

3. A lifting vehicle, comprising:
- a chassis,
- a telescopic boom articulated to the chassis and provided at a distal end with a mounting for attaching implements for handling a load,
- at least one lifting cylinder arranged between the telescopic boom and the chassis and configured to control a tilt angle of the telescopic boom with respect to the chassis,
- a control cab carried by the chassis, wherein the control cab can be tilted with respect to the chassis, at least one cab tilt actuator configured to vary a tilt angle of the control cab with respect to the chassis, and an automatic tilt adjustment system configured to control said at least one cab tilt actuator to automatically vary the tilt angle of the control cab with respect to the chassis as a function of a position of said load, wherein said automatic tilt adjustment system comprises:

a length sensor configured to detect an extension length of said telescopic boom, an angle sensor configured to detect the tilt angle of the telescopic boom with respect to the chassis, a cab tilt sensor configured to detect the tilt angle of the control cab with respect to the chassis, and an electronic control unit configured to receive information supplied by the length sensor and angle sensor and to control said at least one cab tilt actuator according to information supplied by said length sensor and angle sensor, wherein an algorithm is installed in said electronic control unit, which automatically determines the tilt angle of the control cab according to the position of said load.

4. A lifting vehicle, comprising:

a chassis, a telescopic boom articulated to the chassis and provided at a distal end with a mounting for attaching implements for handling a load, at least one lifting cylinder arranged between the telescopic boom and the chassis and configured to control a tilt angle of the telescopic boom with respect to the chassis, a control cab carried by the chassis, wherein the control cab can be tilted with respect to the chassis, at least one cab tilt actuator configured to vary a tilt angle of the control cab with respect to the chassis, and an automatic tilt adjustment system configured to control said at least one cab tilt actuator to automatically vary the tilt angle of the control cab with respect to the chassis as a function of a position of said load, wherein said automatic tilt adjustment system comprises:

a length sensor configured to detect an extension length of said telescopic boom, an angle sensor configured to detect the tilt angle of the telescopic boom with respect to the chassis, a cab tilt sensor configured to detect the tilt angle of the control cab with respect to the chassis, and an electronic control unit configured to receive information supplied by the length sensor and angle sensor and to control said at least one cab tilt actuator according to information supplied by said length sensor and angle sensor, wherein said electronic control unit is connected to a first selector which is configured to be set manually by an operator to select a ratio between the tilt angle of the telescopic boom and the tilt angle of the control cab.

5. The lifting vehicle of claim 4, wherein said electronic control unit is connected to a second selector which is configured to be set manually by the operator to select a minimum tilt angle of the telescopic boom below which the control cab is not tilted.

6. The lifting vehicle of claim 1, wherein the control cab is articulated to the chassis about an axis parallel to an articulation axis of the telescopic boom and wherein said at least one cab tilt actuator is controlled by said electronic control unit to tilt the control cab about its articulation axis.

7. The lifting vehicle of claim 1, wherein the control cab is connected to the chassis by a plurality of active suspension elements controlled by said electronic control unit to set said tilt angle of the control cab.

* * * * *